United States Patent
Earl et al.

(10) Patent No.: US 12,545,327 B2
(45) Date of Patent: *Feb. 10, 2026

(54) ENERGY ABSORBING STRUCTURE FOR A BATTERY

(71) Applicant: Zoox, Inc., Foster City, CA (US)

(72) Inventors: Anthony Earl, Witney (GB); Michael Franz Schink, San Francisco, CA (US); Marcos Puerta Terron, Cheltenham (GB)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/193,541

(22) Filed: Apr. 29, 2025

(65) Prior Publication Data

US 2025/0256776 A1 Aug. 14, 2025

Related U.S. Application Data

(63) Continuation of application No. 17/957,682, filed on Sep. 30, 2022, now Pat. No. 12,351,239.

(51) Int. Cl.
*B62D 21/15* (2006.01)
*B62D 21/17* (2006.01)

(52) U.S. Cl.
CPC ............. *B62D 21/15* (2013.01); *B62D 21/17* (2013.01)

(58) Field of Classification Search
CPC ............................... B62D 21/15; B62D 21/17; B60K 2001/0438; B60K 2001/005
USPC ......................................................... 180/274
See application file for complete search history.

(56) References Cited

U.S. PATENT DOCUMENTS

| | | | |
|---|---|---|---|
| 9,437,854 B2* | 9/2016 | Shimizu | H01M 50/24 |
| 10,862,086 B2* | 12/2020 | Sawatzki | B60K 1/04 |
| 11,084,386 B2 | 8/2021 | Howard et al. | |
| 11,283,121 B1* | 3/2022 | Boecker | H01M 50/249 |
| 11,316,230 B1* | 4/2022 | Boecker | H01M 10/6556 |
| 11,502,360 B2* | 11/2022 | Haeusler | H01M 50/224 |
| 12,194,887 B1* | 1/2025 | Boecker | B60H 1/00278 |
| 2010/0055553 A1* | 3/2010 | Kimura | H01M 10/613 |
| | | | 429/120 |

(Continued)

FOREIGN PATENT DOCUMENTS

| | | |
|---|---|---|
| DE | 102010050826 A1 | 5/2012 |
| DE | 102012001596 A1 | 8/2013 |
| DE | 102018007931 A1 | 3/2019 |

OTHER PUBLICATIONS

Office Action for U.S. Appl. No. 17/957,682, Dated Jan. 15, 2025, Earl, "Energy Absorbing Structure for a Battery ," 13 pages.

*Primary Examiner* — Paul N Dickson
*Assistant Examiner* — Caitlin Anne Miller
(74) *Attorney, Agent, or Firm* — Lee & Hayes, P.C.

(57) ABSTRACT

An energy absorbing structure positioned proximate a vehicle body and a battery housing reduces impact forces imparted to a battery during a side collision. The energy absorbing structure may include energy absorbers positioned on longitudinal sides of the vehicle between the vehicle body and the battery housing. The energy absorbers can represent one or more hollow tubes having a passage aligned with a vent of the battery housing to receive gas from the battery housing and redirect the gas to an area away from a passenger compartment or an exit of the vehicle.

20 Claims, 7 Drawing Sheets

(56) References Cited

U.S. PATENT DOCUMENTS

| | | | |
|---|---|---|---|
| 2012/0261206 A1* | 10/2012 | Yasui | B60L 50/64 |
| | | | 180/274 |
| 2023/0187774 A1* | 6/2023 | Pechan | H01M 10/653 |
| | | | 429/56 |
| 2024/0132160 A1 | 4/2024 | Weston et al. | |
| 2024/0317109 A1* | 9/2024 | Demont | H01M 10/46 |
| 2024/0347849 A1 | 10/2024 | Heid et al. | |

* cited by examiner

ENERGY ABSORBING STRUCTURE FOR A BATTERY

RELATED APPLICATIONS

This application is a continuation of and claims priority to U.S. patent application Ser. No. 17/957,682, filed Sep. 30, 2022, titled "ENERGY ABSORBING STRUCTURE FOR A BATTERY," the entirety of which is incorporated herein by reference.

BACKGROUND

A vehicle, such as an electric vehicle, can include one or more batteries to supply power to the vehicle for lighting, propulsion, etc. However, battery failure can occur for a variety of reasons including a defect in the battery or a collision involving the vehicle (e.g., another vehicle impacts an area of the electric vehicle housing the battery). The battery can emit gas as a result of the battery defect or the collision. In some conventional electric vehicles, the battery may be located under a seat or a floor of a seating area within the vehicle and in the event of failure could emit gas into the seating area and/or a doorway area of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
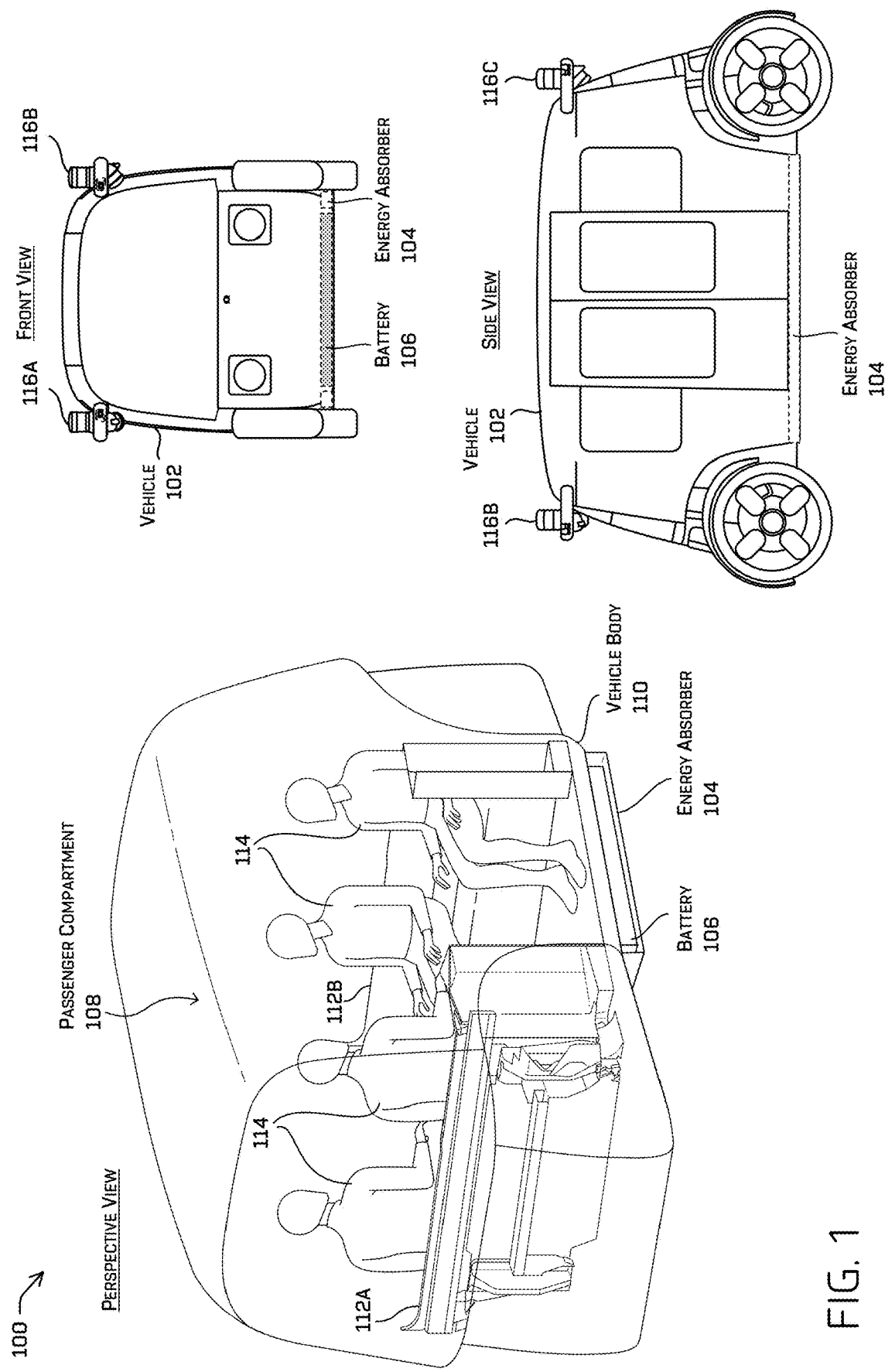
FIG. 1 depicts perspective, front, and side views of an example vehicle having an example energy absorber to implement the techniques described herein.

As mentioned above, an electric vehicle can include one or more batteries which may emit gas as a result of a battery defect or a collision involving the vehicle. Further, the battery location within the vehicle can limit potential solutions for safely managing gas emitted from the battery. Batteries may also be included in a vehicle with a carriage seating configuration where occupants face toward one another which can further limit battery location and available space for mitigating effects of the gas.

This application relates to an energy absorbing structure positioned proximate a battery housing to protect a battery during a collision. For instance, the energy absorbing structure may be positioned proximate a vehicle body and a battery housing to reduce impact forces imparted to the battery during a side collision. The energy absorbing structure may include energy absorbers positioned on longitudinal sides of the vehicle between the vehicle body and the battery housing to minimize an amount of force applied to the battery housing and battery caused by a collision. In some examples, the energy absorbing structure may provide one or more additional functions, such as providing a vent to exhaust gas from a battery in the event of a battery defect, collision, or other event in which gas is expelled from the battery. For instance, the energy absorbing structure can include a hollow tube or other structure having a passage aligned with a vent of the battery housing to receive gas from the battery housing and redirect the gas to an area away from a passenger compartment or a door of the vehicle (e.g., an area associated with an occupant or an area the occupant may use to enter or exit the vehicle). In some examples, the hollow tube or other structure of the energy absorbing structure can additionally or alternatively direct the gas away from other portions of the vehicle to avoid damaging the vehicle (e.g., a flammable gas can be directed away from a tire of the vehicle). Implementing the energy absorbing structure as described herein protects a battery housing of a battery during a collision and "vents" gas to a safe area after a collision or other event in which gas is expelled from a battery of the vehicle.

Generally, the energy absorbing structure may include one or more energy absorbers configured to minimize an amount of force applied to a vehicle, a battery of the vehicle, and/or an occupant of the vehicle during a side collision to prevent damage to the occupant and/or one or more components or systems of the vehicle. The energy absorbers can be configured to deform under a compressive force. The energy absorbers can be designed based on particular geometric configurations, compositions of materials, or combinations thereof to promote such deformations. In some examples, the energy absorbers are configured to plastically deform as a result of collision. In various examples, the energy absorbing structure is configured to redirect gas associated with a battery in one or more hollow tubes that are configured to provide a passage for the gas even after the collision (e.g., deform while still providing fluid communication between a battery housing and an opening proximate a body of the vehicle).

A vehicle can include one or more batteries at least partially enclosed by a battery housing (or respective battery housings). A vent in the battery housing can provide an egress for gas from the battery (e.g., due to an internal failure caused by a collision or defect). The energy absorbing structure can comprise one or more hollow tubes disposed between a battery housing and a side of the vehicle body and extending in a longitudinal direction of the vehicle. The energy absorbing structure can also comprise a passage extending through a sidewall of the hollow tube that is aligned with the vent opening of the battery housing to receive the gas from the battery housing and redirect the gas along at least a portion of a length of the hollow tube. In some examples, multiple hollow tubes can fluidly connect to each other creating multiple passages for gas to disperse, cool, etc., before exiting the multiple hollow tubes at a direction away from the vehicle.

The vent of the battery housing can include a valve or burst disk disposed in an opening associated with the vent to seal the opening of the battery housing. In various examples, the valve or burst disk is configured to activate to an open state in response to a pressure in the battery housing exceeding a threshold pressure, thereby enabling for expulsion of the gas associated with the battery. For instance, a hollow tube can receive the gas via the passage in the side of the hollow tube and direct the gas toward an exhaust opening for exhausting the gas to an environment. In examples in which the battery is included in a vehicle or other device, the energy absorbing structure can further comprise a deflector to deflect the gas to a region of the environment (e.g., an area away from a door of the vehicle).

Generally, the energy absorbing structure can include one or more of: an energy absorber, a hollow tube, a passage, a deflector, a vent, a valve, a burst disk, and a heat shield. The heat shield can be coupled to passages, the deflector, a portion of the vehicle, or other area that the gas may contact when flowing from the battery to an opening at a safe location.

The energy absorbers of the energy absorbing structure may be coupled directly or indirectly to a vehicle body and may be positioned outboard of the battery housing. In some examples, the position of the energy absorbing structure is based at least in part on a position of the battery. In some examples, the position of the battery can be adjacent a passenger compartment, under a seat, under a floor of the passenger compartment, proximate a roof of the vehicle (e.g., above the passenger compartment), in a drive assembly, or other location within the vehicle. In examples when the battery is disposed beneath a passenger compartment of the vehicle body, the hollow tube(s) extends at least to an extent of the passenger compartment and is configured to direct the gas away from an exit of the passenger compartment (e.g., between the exit of the passenger compartment and a tire of the vehicle).

In some examples, an energy absorber comprises hollow tubes formed from a plastically deformable material such as aluminum, steel, or other metals, carbon fiber, polymers, plastics, foams, or combinations of the foregoing. In some examples, the hollow tube(s) include a variety of shapes including a square, rectangle, triangle, hexagon, octagon, or trapezoid. In some examples, multiple hollow tubes can form a structure which can include a honeycomb structure. In some examples, each hollow tube of the structure may have a uniform thickness of between about 2 mm and 5 mm. Hollow tubes of the structure can vary in thickness to provide different levels of absorption caused by an impact. For instance, a hollow tube positioned closer to the battery housing than another hollow tube can be more rigid to reduce deformity by the hollow tube (relative to the other hollow tube further from the battery). In this way, the hollow tubes can be designed to collectively crush or otherwise deform, thereby absorbing energy of the collision, without intruding on other systems and structures of the vehicle (e.g., battery, etc.) or the passenger compartment. Further, the hollow tubes can provide and maintain fluid communication for the gas from the battery before, during, and/or after the collision.

In some examples, the energy absorber may be formed by extrusion. The energy absorbers can also be formed using other manufacturing processes including, for example, casting, injection molding, three-dimensional printing (or other additive manufacturing techniques), or machining. Energy absorbers that are formed by casting or injection molding may have outer wall thicknesses and/or webs that vary along the length of the energy absorber. For example, the thickness of the walls of the energy absorber may be thicker at the proximal end of the energy absorber than at the distal end of the energy absorber. This may allow the energy absorber to provide varying resistance or energy absorption over the distance that it deforms. For instance, the energy absorber may be configured so that the thinner portion of the energy absorber deforms relatively easily at first and progressively increases as the deformation increases. This may minimize the forces experienced by the vehicle and occupant during lower impact collisions while allowing the energy absorber to absorb more energy later in the crash pulse.

In some examples, the energy absorbing structure may be used on a vehicle that is bidirectional (i.e., where both longitudinal ends of the vehicle may be the leading end of the vehicle depending on the direction of travel). A bidirectional vehicle may have an energy absorbing structure positioned at one or both ends of the vehicle.

As mentioned, the energy absorbing structure may include energy absorbers configured to minimize an amount of force applied to the battery housing and battery caused by a collision while also providing a vent to exhaust gas from a battery in the event of a battery defect, collision, or other event in which gas is expelled from the battery. By having the energy absorbing structure perform multiple functions, space and/or excess weight of the vehicle can be reduced (relative to not implanting the energy absorbing structure).

While this application describes examples in which the energy absorbing structure is applied to an autonomous vehicle, this application is not limited to bidirectional vehicles or autonomous vehicles. The energy absorbing structure described in this application can be applied to other vehicle types includes a non-bidirectional and/or non-autonomous vehicle. The vehicle may be powered by one or more internal combustion engines, electric motors powered by one or more power supplies (e.g., batteries, hydrogen fuel cells, etc.), or any combination thereof. The vehicle in this application is depicted as having four wheels/tires. However, other types and configurations of vehicles are contemplated, such as, for example, vans, sport utility vehicles, crossover vehicles, trucks, buses, agricultural vehicles, construction vehicles, and trains vehicles. While this application describes and depicts an energy absorbing structure positioned in association a side of the vehicle, the energy absorbing structure described in this application can be positioned anywhere along a length or width of the vehicle. While this application describes and depicts a vehicle having a carriage-seating arrangement, the energy absorbing structure disclosed can be applied to vehicles having different seating arrangements, including where all passengers face the direction of forward motion of the vehicle, where all passengers face opposite the direction of forward motion, and/or where one or more passengers face a lateral side of the vehicle.

The techniques and systems described herein may be implemented in a number of ways. Example implementations are provided below with reference to the figures.

FIG. 1 depicts perspective, front, and side views 100 of an example vehicle having an example energy absorber to implement the techniques described herein. For example, a vehicle 102 can include an energy absorber 104 to protect a battery 106 and/or to provide fluid communication for gas emitted from the battery 106. The battery 106 can emit gas responsive to a collision associated with the vehicle and/or a defect in the battery 106. Some features of the vehicle 102 are removed for clarity such as omitting the wheels from the vehicle 102 in the perspective view to better illustrate features of the energy absorber 104.

The vehicle 102 has a longitudinal axis generally aligned with a direction of travel when the vehicle is traveling straight (not turning) and a lateral axis perpendicular to the longitudinal axis. In various examples, the vehicle 102 can represent a bi-directional autonomous vehicle, such as the vehicle 502 of FIG. 5.

As shown in FIG. 1, the vehicle 102 includes two wheels/tires positioned at each longitudinal end of the vehicle 102. The vehicle 102 may include doors positioned proximate the center of the length of the vehicle. The vehicle 102 includes an energy absorber 104 that is configured to provide protection to an occupant and/or a battery (or other component or system) in the vehicle 102 from a side impact where the point of impact is generally between two wheels of the vehicle (as shown in the side view of the vehicle).

The energy absorber 104 may be positioned in a variety of positions including proximate a passenger compartment 108 of the vehicle 102. In some examples, the energy absorber 104 may be positioned below a floor or seat associated with the passenger compartment 108, along the bottom of the door opening of the vehicle 102, one or more longitudinal sides of the vehicle 102, or adjacent a roof of the vehicle 102, just to name a few. In one non-limiting example, the energy absorber 104 may be positioned longitudinally outboard of the passenger compartment 108. For example, the energy absorber 104 may be positioned between a first longitudinal end and a second longitudinal end of the vehicle 102. In some examples, the energy absorber 104 may be positioned between the wheels of the vehicle 102 and may optionally extend inward and/or behind a wheel of the vehicle 102. In various examples, the energy absorber 104 may be positioned and angled to receive and absorb a side impact that is in the direction of a battery housing of the vehicle (omitted in FIG. 1 for clarity).

Figure 2A:
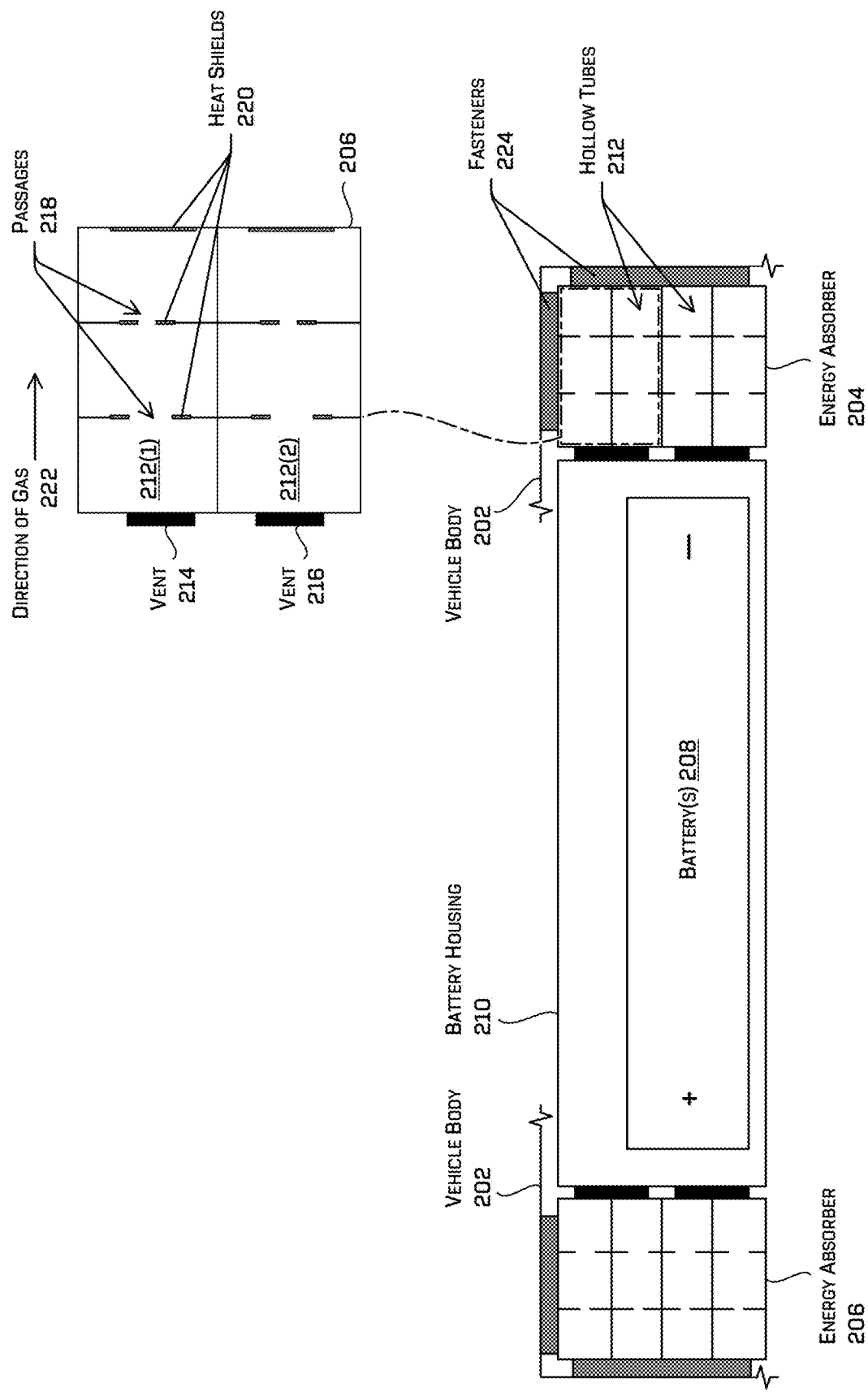
FIG. 2A is a cross sectional view of an example vehicle coupled to an example energy absorber for venting gas associated with an example battery.

In various examples, the battery 106 can represent one or more cells for providing power to the vehicle 102. As noted herein, the battery 106 can occupy a variety of positions within the vehicle 102 including the position under the passenger compartment 108 as shown. In some examples, the passenger compartment 108 can represent an area within the vehicle body 110, and as shown includes two seats 112, including a first seat 112A and a second seat 112B, oriented facing one another (e.g. a "carriage seating" configuration). In other examples, any number of one or more seats may be disposed in a vehicle at locations and/or orientations other than what is indicated in FIG. 2A. For instance, though illustrated as two bench style seats 112 which can accommodate multiple occupants 114, in some examples, multiple individual bucket-style seats may be disposed in a vehicle. An occupant(s) 114 in the first seat 112A may be positioned by the first seat to face an occupant(s) in the second seat 112B.

FIG. 1 further depicts a first sensor system 116A, a second sensor system 116B, a first sensor system 116C (collectively referred to the sensor systems 116), though any number of sensor systems may be used. The sensor systems 116 may include lidar sensors, radar sensors, ultrasonic transducers, sonar sensors, location sensors, inertial sensors, accelerometers, magnetometers, gyroscopes, cameras, microphones, wheel encoders, environment sensors, etc. The vehicle 102 can include one or more vehicle computing devices (not shown) configured to control operation of the vehicle 102. The vehicle computing device (e.g., the vehicle computing device(s) 504) can receive sensor data from the sensor systems 116 for performing a variety of operations including detecting a potential collision between the vehicle 102 and an object in an environment. In some examples, the vehicle computing device(s) can include a component configured to control actuators that open and close portions of the energy absorber 104 to control the flow of gas toward a particular direction relative to the vehicle 102. For instance, the vehicle computing device can include a vent controller to operate a vent between an open state and a closed state based at least in part on a collision or a prediction of a collision (e.g., operating the vent a time period just before the collision).

In some examples, the energy absorber 104 can represent one or more hollow tubes configured to absorb energy from an impact while also providing fluid communication of gas from the battery 106 based on a collision associated with the vehicle 102 or other failure associated with the battery 106. Further description of example energy absorbers are discussed throughout this disclosure including in the following figures.

FIG. 2A is a cross sectional view of an example vehicle coupled to an example energy absorber for venting gas associated with an example battery. For example, a vehicle (e.g., the vehicle 102 of FIG. 1) having a vehicle body 202 can be coupled to a first energy absorber 204 and a second energy absorber 206 to protect a battery(s) 208 within a battery housing 210 and/or an occupant of the vehicle from an impact (e.g., a compressive force) to either side of the vehicle 102. Generally, the construction of the energy absorber 204 enables the energy absorber to crush or otherwise deform, thereby absorbing energy of the collision, without intruding on other systems and structures of the vehicle (e.g., battery, passenger compartment, etc.) while also fluidly communicating gas from the battery to another location.

The energy absorber 204 can comprise hollow tubes 212 for directing gas from one or more vents such as vent 214 and/or vent 216. Any number of hollow tunes can be used such as a hollow tube 212(1), a hollow tube 212(2), . . . , up to a hollow tube 212(N) where N is an integer. A vent can represent an opening in the battery housing and can include a valve or burst disk for maintaining a threshold amount of pressure within the battery housing 210. In various examples, the valve or burst disk is activatable to open, in response to a pressure in the battery housing exceeding a threshold pressure, for expulsion of the gas (e.g., due to battery failure whether or not caused by a collision). In some examples, the vent can open and close via a signal from a vent controller indicating to activate an actuator that moves a partition (not shown) between an open state and a closed state. At least hollow tube of the hollow tubes 212 can receive the gas from the vent via a passage 218 extending through a sidewall of the hollow tube and direct the gas to an opening at an end of the hollow tube. Generally, the energy absorber 204 can include any number of passages 218 to redirect the gas along at least a portion of a length of one or more of the hollow tubes. The heat shields 220 may be associated with a passage and/or or side of a hollow tube as illustrated in FIG. 2A. A heat shield 220 can, for example, be disposed on any surface of the energy absorber 204 including the hollow tubes 212 to shield portions of the energy absorber 204 from direct impingement of the gas and to help maintain geometric integrity of the energy absorber 204. In some examples, the heat shields 220 enable the hollow tubes 212 to tolerate relatively higher temperatures associated with the gas including temperatures at which the gas ignites. In various examples, a heat shield can comprise a material (e.g., an alloy, a ceramic, a mica sheet, etc.), a coating (e.g., a reflective coating), and the like, to change a temperature operating range of an area coupled to the heat shield. The heat shield 220 can be applied to a portion of the energy absorber 204 and/or the energy absorber 206 using a variety of manufacturing techniques including dipping, coating, pressing, heating, and so on. For instance, a hollow tube can be extruded, then the passages can be added and aligned with passages of another hollow tube, and inserts can be added near the passages for added structural and/or thermal support. In various examples, material (e.g., a tube or honeycomb structure) can be inserted into the passages of the hollow tubes to provide local reinforcement around a passage (hole) profile. In examples, the holes can also be aligned with an exterior vent hole to couple with a battery component, as further disclosed herein.

The hollow tubes 212 closest to the battery housing 210 (e.g., 212(1) and 212(2)) can, in some examples, be stronger and/or more rigid than the outer tubes closer to the vehicle body 202 to minimize a likelihood that all of the hollow tubes the energy absorber 204 will be pinched off during a collision. For example, the energy absorber 204 comprises a first portion proximate the battery housing 210 and a second portion distal from the battery housing 210, and a rigidity of the first portion is higher than a rigidity of the second portion. The hollow tubes 212 may have a uniform thickness or different thicknesses depending in part on materials associated with the hollow tubes.

In some examples, the hollow tubes 212 are removable coupled to the battery housing 210 or integrated as part of the battery housing 210. For instance, the hollow tubes 212 may be fastened to the battery housing 210 in a variety of ways including being integrated as part of the battery housing 210 during manufacturing.

The energy absorber 204 may be formed from a plastically deformable material such as aluminum, steel, other deformable metals, carbon fiber, a polymer, plastic, or foam, or a combination thereof. Depending on the material, the energy absorber can be made by extrusion, casting, injection molding, three-dimensional printing, machining, combinations of the foregoing, or other manufacturing techniques. In some embodiments, the energy absorber 204 is formed from extruded aluminum such as A356 Alloy aluminum.

In some examples, the energy absorber 204 may have a width W of between about 100 mm and about 300 mm, a height H of between about 100 mm and 300 mm, and a depth D of between about 25 mm and about 700 mm. In some examples the energy absorber 204 may have a width W of between about 150 mm and about 200 mm, a height H of between about 150 mm and 200 mm, and a depth D of between about 50 mm and about 250 mm. In some examples, the dimensions (W, H, and/or D) may be larger or smaller than the examples above. Also, in some examples, the width W, height H, and/or depth D may vary from one part of the energy absorber 204 to another.

In some examples, the passages 218 extend in the longitudinal direction of the vehicle, and one or more additional passages fluidly connect an interior of the hollow tube with an interior of the one or more additional hollow tubes. In this way, a direction of the gas 222 can flow from the vent 214 and/or the vent 216 to an area safe to expel the gas relative to vehicle and/or an occupant. Generally, the direction of the gas 222 is toward and away from an exterior of vehicle. For example, the passages 218 can extend to an opening adjacent a wheel well or other area free of people and vehicle components that are susceptible to failure caused by the gas (e.g., a tire melting). In some examples, a deflector can direct the gas from the opening of the hollow tube(s) to a region surrounding the vehicle (e.g., a region above, below, or to a side of the vehicle that is not an exit). Additional detail of a deflector is described throughout this disclosure including in FIG. 3.

The passages 218 may differ in size, shape, and/or configuration to provide various paths for the gas to be directed away from the vehicle. In some examples, a passage closer to battery can be larger, thicker, or more rigid than a passage further from the battery (e.g., get smaller as you move toward exterior of vehicle). In some examples, the passages 218 can have a same size opening, or change size from one hollow tube to another hollow tube. As mentioned, the hollow tubes 212 are plastically deformable to ensure that at least one passage remains following a collision.

In some examples, the hollow tubes of the energy absorber 104 can be disposed between the battery housing 210 and the vehicle body 202 by one or more fasteners 224. The fasteners 224 can represent permanent, semi-permanent, or non-permanent adhesives, screws, bolts, rivets, mounting plates, support structure, and the like. The one or more fasteners 224 may be configured to receive and couple to the energy absorber 204 directly or indirectly to the vehicle.

In some examples, the battery housing 210 may be coupled to or integral with the vehicle body 202 and/or a drive assembly frame of the vehicle 102. In some examples, a portion of the battery housing 210 is positioned in between or in proximity to the energy absorber 204. The battery housing 210 may be relatively more rigid than the energy absorber 204 so that the battery housing 210 does not deform substantially during transfer of loads, thereby protecting the battery(s) 208 from impact during the collision (e.g., minimize a maximum force transmitted to the battery). In some examples, there is a gap or distance between the battery(s) 208 and the battery housing 210 for additional protection from an impact. The gap may be between about 0 mm and about 10 mm, or some other range depending on the implementation.

In some examples, the battery housing 210 may be coupled to or integral with the vehicle body 202 of the vehicle 102. Further, the vent 214 and/or the vent 216 can be coupled to or integral with the energy absorber 204 and/or the battery housing 210.

In some examples, other structures including fuel tanks, motors, controllers, computers, cooling systems, etc. can be protected from impact damage using a housing or casing similar to the battery housing 210 and/or energy absorbing structures such as those described herein.

Although FIG. 2A depicts the energy absorber 204 having twelve hollow tubes, the energy absorber 204 may have more or fewer hollow tubes. The energy absorber 204 may, for example, have as many hollow tubes as allowed by the size, material, and method of manufacturing the energy absorber and/or by an amount of space available between the vehicle body 202 and the battery housing 210. The hollow tubes 212 may be generally uniform in size (e.g., have approximately a same cross-sectional area, volume, etc.) or may vary. In some examples, hollow tubes 212 of different sizes and shapes can be used in a single energy absorber 204. In some examples, one or more initiators (e.g., holes, depressions, bends, etc.) or crumple zones may be disposed on the energy absorber 204 to initiate deformation of the energy absorber 204 during a collision to minimize damage to other vehicle systems. Though some examples are described in relation to the energy absorber 204, such examples can also apply to additional energy absorbers disposed on the vehicle, such as the energy absorber 206.

Figure 2B:
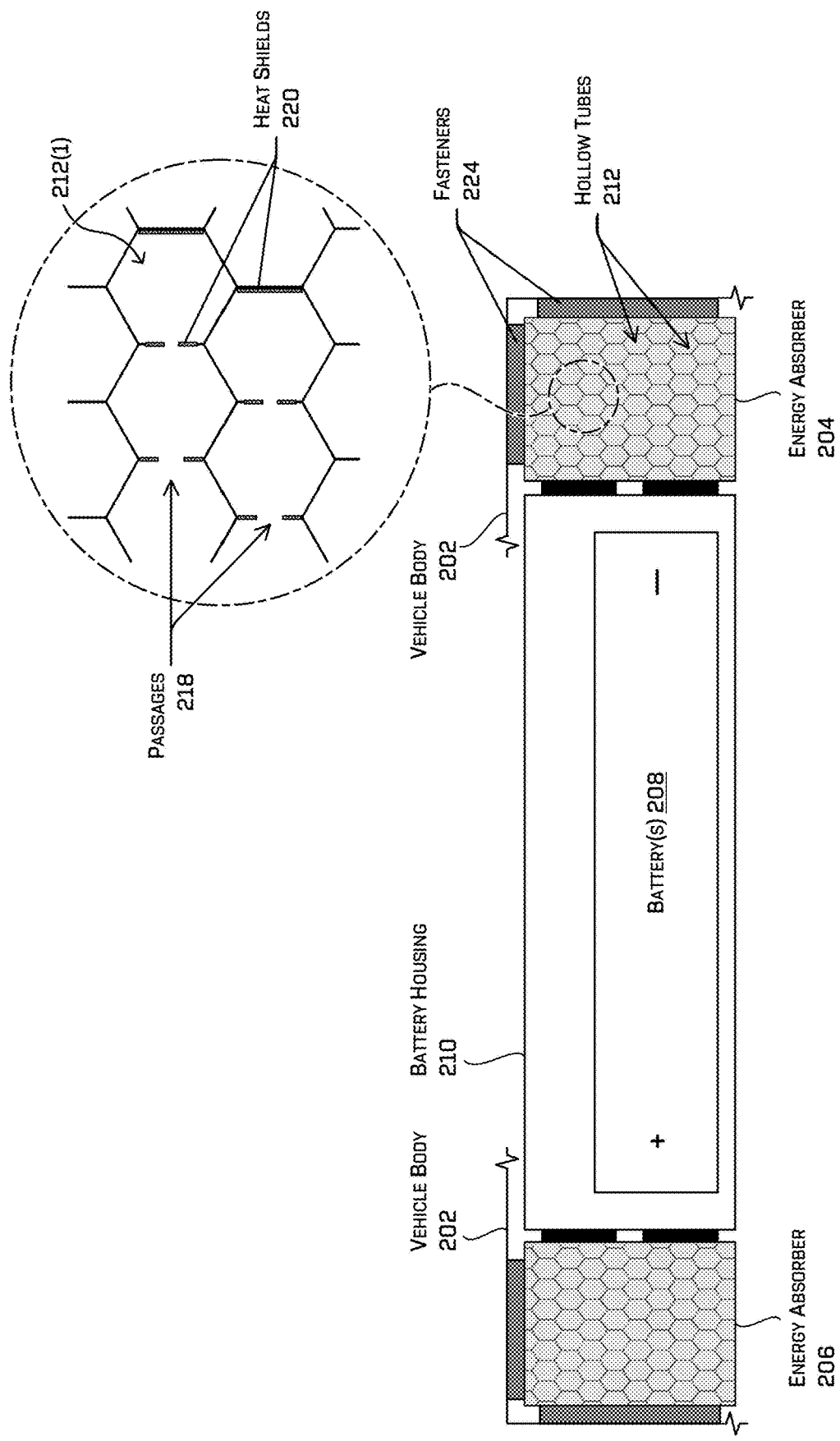
FIG. 2B is a cross sectional view of another example vehicle coupled to an example energy absorber for venting gas associated with an example battery.

FIG. 2B is a cross sectional view of an example vehicle coupled to an another example energy absorber for venting gas associated with an example battery. For example, the energy absorber 204 and the energy absorber 206 can comprise an open cellular structure such as the honeycomb structure shown. Though shown as a honeycomb structure in FIG. 2B, a cell of the open cellular structure can be generally prismatic in shape and has a perimeter shape that is substantially square, rectangular, triangular, hexagonal, octagonal, or trapezoidal. Each honeycomb structure can have a uniform thickness of between about 2 mm and 4 mm. Passages 218 associated with the honeycomb structure of the energy absorber 204 provide a path for gas to travel from the battery(s) 208 to an opening of one or more of the hollow tubes 212.

Figure 2C:
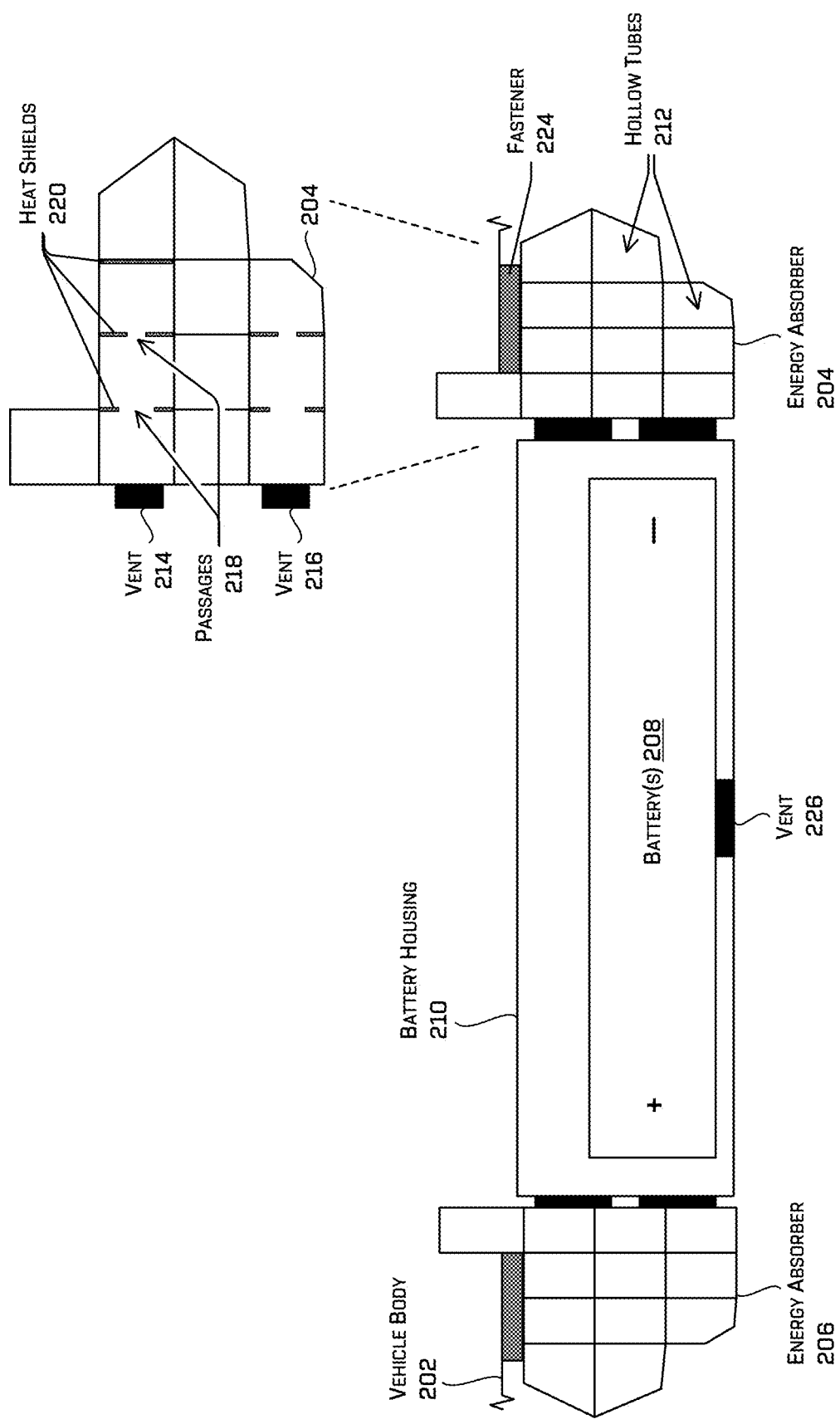
FIG. 2C is a cross sectional view of another example vehicle coupled to an example energy absorber for venting gas associated with an example battery.

FIG. 2C is a cross sectional view of an example vehicle coupled to an another example energy absorber for venting gas associated with an example battery. For example, the energy absorber 204 and the energy absorber 206 are shown to include the hollow tubes 212 in a variety of shapes and sizes to absorb energy in the vicinity of the battery(s) 208 caused by a compressive force. The energy absorber 204 and the energy absorber 206 of FIG. 2C includes hollow tubes 212 having different shapes to maximize an amount of compression force that the vehicle 102, the battery housing 210, and/or the battery(s) 208 can tolerate as a result of a collision.

In some examples, the energy absorber 204 and/or the energy absorber 206 can include a first portion (e.g., subset of tubes/chambers) that is used for exhausting the gas from the battery(s) 208, and a second portion (second subset of tubes/chambers) that are not used for exhausting the gas from the battery(s) 208. As shown in FIG. 2C, some hollow tubes are used to exhaust the gas, while others are not (e.g., the topmost hollow tube).

A vent 226 can represent a valve or burst disk configured as a pressure relief in examples when the vent 214 and/or the vent 216 fail to open, such as a result of being pinched closed by a collision. Generally, the vent 226 provides an additional failsafe over pressure vent having a higher pressure threshold that a pressure threshold associated with the vent 214 and/or the vent 216. In this way, gas can be emitted towards the ground via the vent 226 in the event that another fluid communication in the passages 218 is lost.

Figure 3:
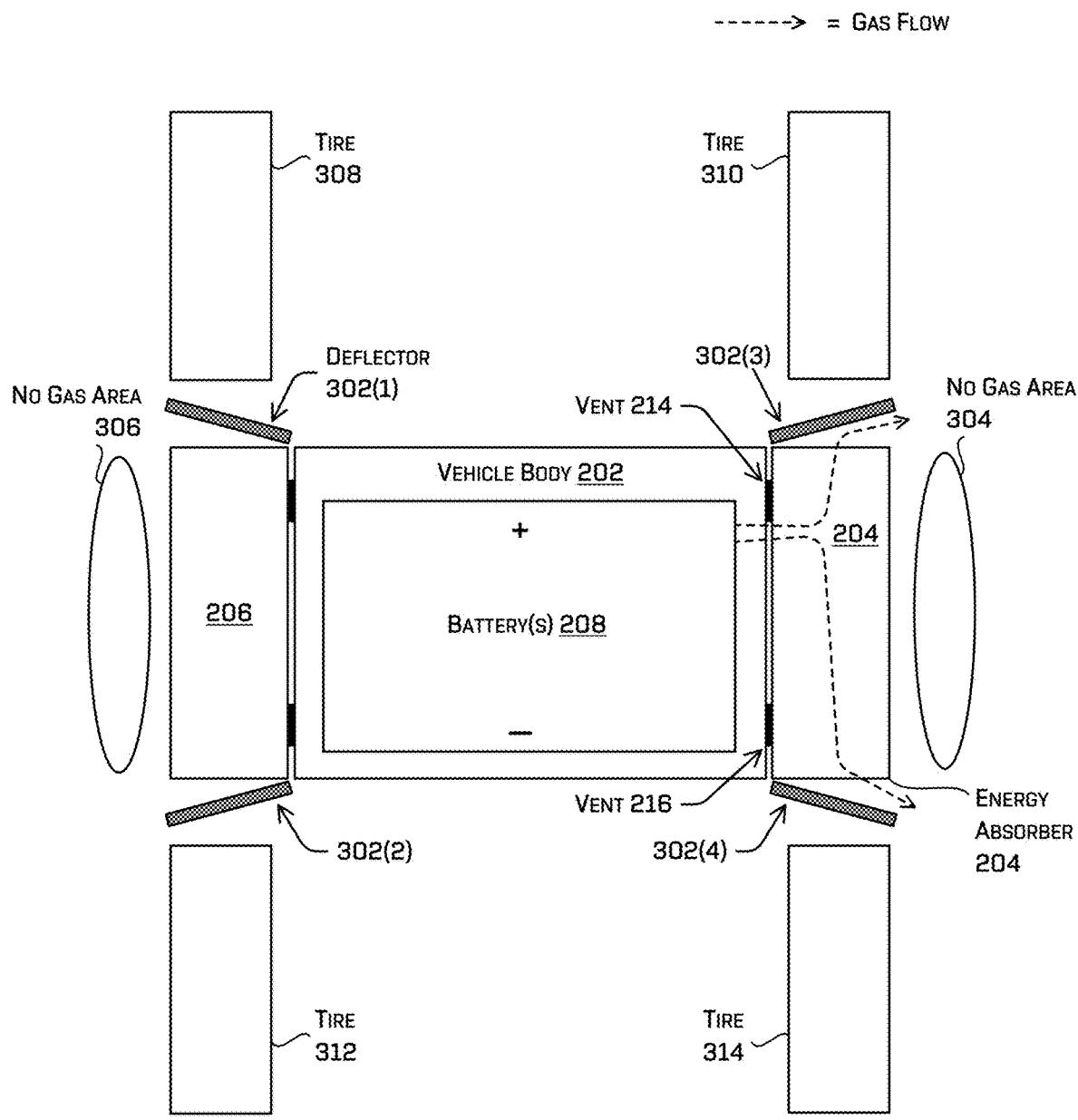
FIG. 3 is a top down view an example energy absorber structure having example deflection devices to direct gas expelled from a battery away from a passenger compartment, door, and/or other components of the vehicle.

FIG. 3 is a top down view an example energy absorber structure having example deflection devices to direct gas expelled from a battery away from a passenger compartment, door, and/or other components of the vehicle. For example, a vehicle (e.g., the vehicle 102 of FIG. 1 or the vehicle 502 of FIG. 5), can include the energy absorber 204 and the energy absorber 206 of FIGS. 2A-2C comprising deflectors 302 for receiving gas associated with the battery(s) 208.

Generally, the deflectors 302 can be disposed in a variety of locations, such as a wheel well, and be configured to direct gas from the battery housing 210 toward a region to be free of the gas such as the no gas area 304 and the no gas area 306. For instance, a deflector 302(1) can be associated with a first end of a hollow tube(s) and a deflector 302(2) can be associated with a second end of a same or different hollow tube(s) of the energy absorber 206. Also, a deflector 302(3) can be associated with a first end of a hollow tube(s) of the energy absorber 204 and a deflector 302(4) can be associated with a second end of a hollow tube(s) of the energy absorber 204. The deflectors 302 can be configured to receive the gas from a respective energy absorber and provide a path to an exterior of the vehicle for the gas to avoid the no gas area 304 and/or the no gas area 306. Additionally, the deflectors protect portions of the vehicle from the gas including a tire 308, a tire 310, a tire 312, and a tire 314 of the vehicle. In this way, gas having sufficient heat to melt a tire (or other portions of the vehicle) and otherwise effect operation of the vehicle can be mitigated in the event of a collision.

Generally, the no gas area 304 and the no gas area 306 represent an exit area of a passenger compartment such as region by a door of the vehicle where an occupant may exit the passenger compartment. In some examples, the no gas area 304 and the no gas area 306 can represent a region between the exit of the passenger compartment and a tire of the vehicle when the gas exits the hollow tube. Other no gas areas may also be identified, and the deflectors 302 can be configured to further protect these additional areas such as other openings that allow for egress by an occupant including after the collision.

In some examples, the vent 214 or the vent 216 can operate between an open state and a closed state based on a signal from a vent controller indicating to activate an actuator that moves a partition (not shown) adjacent the vent 214 and/or the vent 216. In some examples, the vents associated with the energy absorber 206 can also or instead be controlled independently responsive to detecting a collision. For instance, a vent on a same side or an opposite side of a collision point of the vehicle can be opened and/or closed automatically by the vent controller as needed to expel gas associated with a battery.

In some examples, a gasket can be disposed between a deflector and the opening of the hollow tube(s) from which the deflector receives the gas. The gasket can be configured to prevent materials, liquids, or other debris from entering from the environment into as area adjacent the deflector. In various examples, the deflector may tilt downwardly at an angle to directs the gas toward the ground while also preventing debris from enter a cavity associated with the deflector. By including a gasket and/or tilting the deflector, foreign particles such as debris and water can prevent build up and/or sufficient blockage that would prevent the gas from exiting to the environment.

In some examples, a gasket can be disposed between a gasket or seal to prevent gas from getting into passenger compartment. For example, the gasket or seal can be disposed around vent openings associated with the battery, the battery housing, and/or the energy absorber (e.g., between or around the vent openings, between the battery housing and an opening of a hollow tube, etc.).

In some examples, the deflectors 302 can extend beyond a length or a width associated with the energy absorber 204 to direct as needed to a particular area. In some examples, the functionality or configuration of the deflectors 302(3) and 302(4) can be integral with the energy absorber 204 and/or with the vehicle body 202. For instance, the hollow tube(s) can be bent and extended as required to reach an exterior of the vehicle rather than relying on one or more of the deflectors 302. In some examples, the energy absorbing structure could include a roll cage type structure and could exhaust the gas out a top or other location of the vehicle using a hollow tube of the roll cage type structure.

Figure 4:
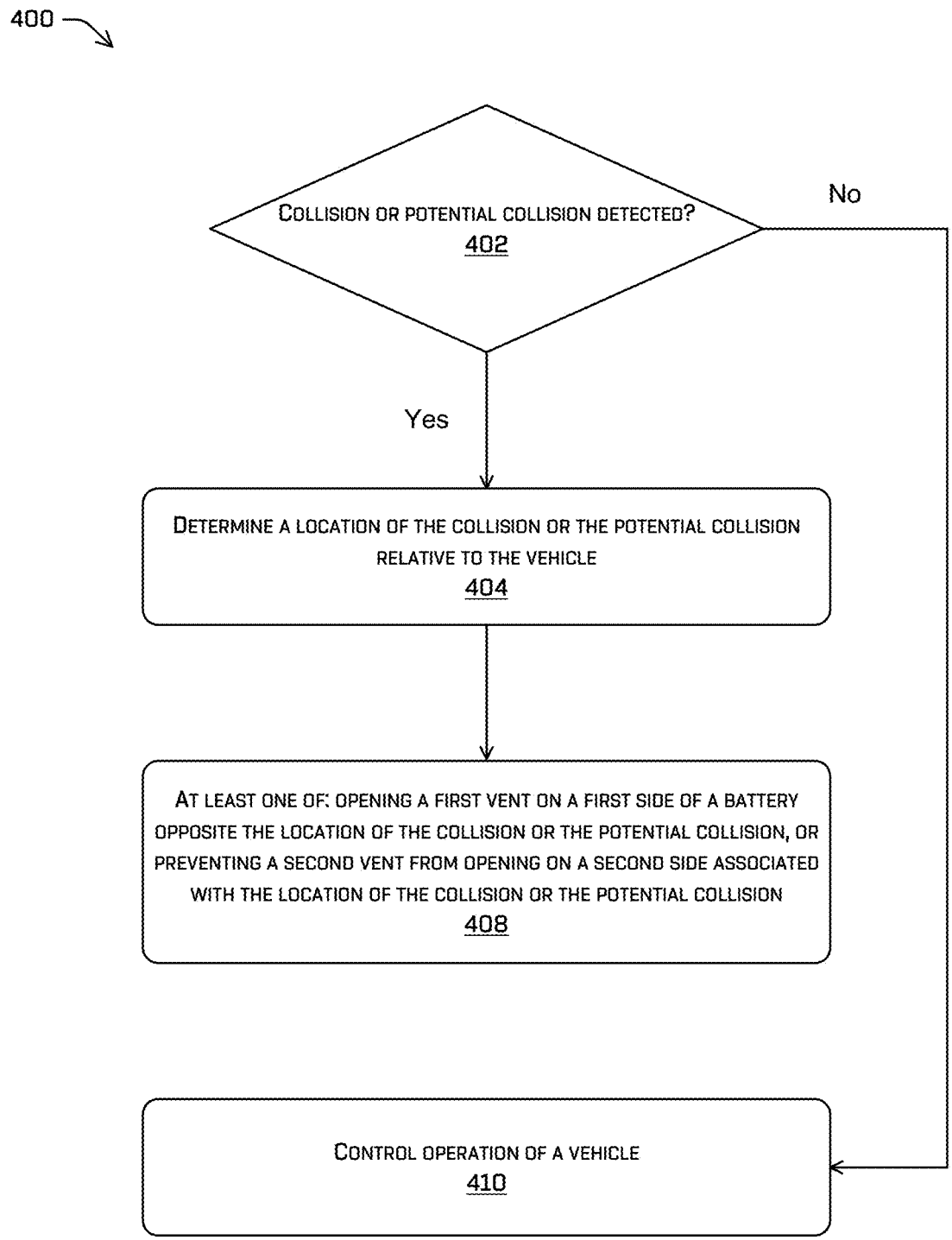
FIG. 4 is a flowchart depicting an example process for determining an action and controlling one or more vents associated with a battery.

FIG. 4 is a flowchart depicting an example process 400 for determining an action and controlling one or more vents associated with a battery. Some or all of the process 400 may be performed by one or more elements in FIGS. 1-3 and 5, as described herein. For example, some or all of process 400 may be performed by the vehicle computing device(s) 504 of FIG. 5 in association with the energy absorber 204 and/or the energy absorber 206.

At operation 402, the process may include detecting, by a computing device associated with a vehicle, a collision or a potential collision. For example, the vehicle computing device(s) 504 can implement one or more components to determine whether a collision occurred and/or to predict a likelihood for a collision between the vehicle and an object in an environment of the vehicle. In some examples, the determination(s) can be based at least in part on sensor data from one or more sensors (e.g., the sensor system(s) 506 and/or a sensor remote from the vehicle such as a sensor in the environment). If the collision or the potential collision is not detected (e.g., "no" in the operation 402), the process can continue to operation 410 to cause operation of a vehicle to be controlled. If the collision or the potential collision is detected (e.g., "yes" in the operation 402), the process continues to operation 404 to update a parameter(s) of the first model and/or the second model based at least in part on the output by the second model. Of course, in some examples, operations can be performed in parallel, depending on an implementation.

At operation 404, the process may include determining a location of the collision or the potential collision relative to the vehicle. For example, the operation 404 can include the vehicle computing device(s) 504 can implement a component to identify an area, region, or point at which an object impacts the vehicle based at least in part on sensor data (e.g., lidar data, image data, audio data, inertial measurement data, etc.). The operation 404 may also or instead include determining an intersection point of the collision at a future time including an area, region, or point of the vehicle that is associated with a probability of the collision with the object. Additional details of determining and/or predicting an occurrence of a collision are described in U.S. patent application Ser. No. 16/189,726, filed on Nov. 13, 2018, entitled "Perception Collision Avoidance," which is incorporated herein by reference in its entirety and for all purposes.

At operation 406, the process may include at least one of: opening a first vent on a first side of a battery opposite the location of the collision, or preventing a second vent on a second side associated with the location of the collision from opening. For example, a vent controller (e.g., vent controller 530 of the vehicle computer device(s) 504) can control operation of the vent 214 and/or the vent 216 between an open state and a closed state based at least in part on the location of the collision. In some examples, the vent controller can be configured to send a signal to a respective vent to control a partition of the vent just prior to a collision (based on the predicted intersection point), or after the collision (based on the location of the impact relative to a surface of the vehicle). The vent controller can cause a vent opposite the location of the collision to open and/or a vent on a same side as the location of the collision to close to direct gas away from a side of the vehicle associated with the collision.

At operation 410, the process may include controlling operation of a vehicle. For example, a vehicle computing device can control various systems of the vehicle to cause the vehicle to navigate in an environment. In some examples, a vehicle (e.g., the vehicle 502) can determine a vehicle trajectory to navigate in the environment based at least in part on sensor data from one or more sensors. The vehicle can include one or more batteries associated with one or more energy absorbers.

Figure 5:
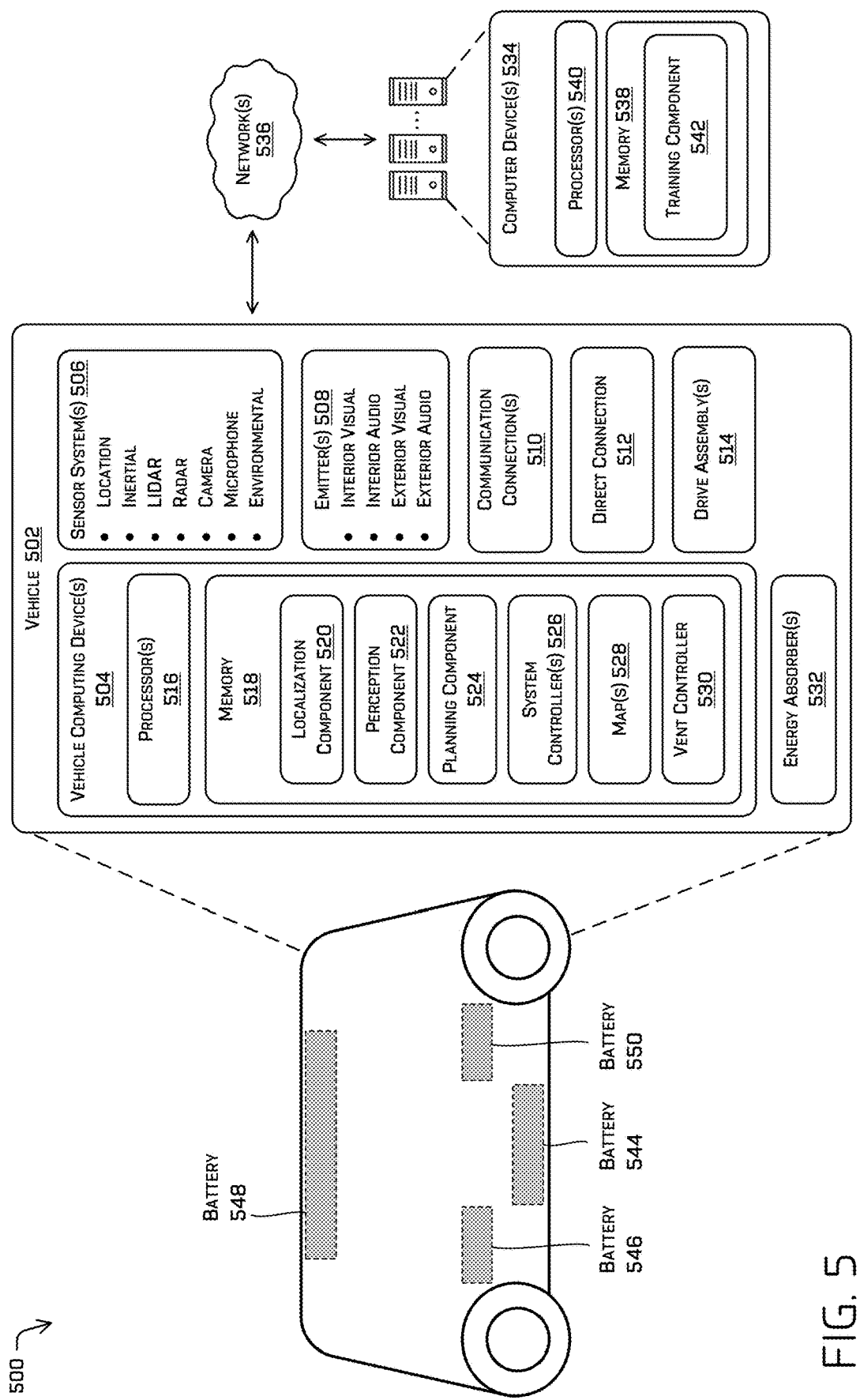
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502. The vehicle 502 may include a vehicle computing device(s) 504, one or more sensor systems 506, one or more emitters 508, one or more communication connections 510, at least one direct connection 512, and one or more drive assemblies 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device(s) 504 stores a localization component 520, a perception component 522, a planning component 524, one or more system controllers 526, one or more maps 528, and a vent controller 530. Though depicted in FIG. 5 as residing in the memory 518 for illustrative purposes, it is contemplated that the localization component 520, the perception component 522, the planning component 524, the system controller(s) 526, the map(s) 528, and/or the vent controller 530 can additionally, or alternatively, be accessible to the vehicle 502 (e.g., stored on, or otherwise accessible by, memory remote from the vehicle 502, such as, for example, on memory 538 of a remote computer device 534). The vehicle 502 includes one or more energy absorbers 532 which can include at least the functionality and/or characteristics of the energy absorber 204 of FIGS. 2A-2C to perform the energy absorbing and gas management techniques described herein.

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.).

In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 may include a prediction component to generate predicted trajectories of objects (e.g., objects) in an environment. For example, a prediction component may generate one or more predicted trajectories for objects within a threshold distance from the vehicle 502. In some examples, a prediction component may measure a trace of an object and generate a trajectory for the object based on observed and predicted behavior.

In at least one example, the vehicle computing device(s) 504 may include one or more system controllers 526, which may be configured to control steering, propulsion, braking, safety, emitters, communication, and other systems of the vehicle 502. The system controller(s) 526 may communicate with and/or control corresponding systems of the drive assembly(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect objects in an environment, generate routes, determine actions and/or trajectories to navigate within an environment.

In some examples, the one or more maps 528 may be stored on a remote computing device(s) (such as the computer device(s) 534) accessible via network(s) 536. In some examples, multiple maps 528 may be stored based on, for example, a characteristic (e.g., type of entity, time of day, day of week, season of the year, etc.). Storing multiple maps 528 may have similar memory requirements but increase the speed at which data in a map may be accessed.

In various examples, the vent controller 530 can be configured to generate a signal to control a vent associated with a battery housing, energy absorber, or battery. For instance, the vent controller 530 can determine that a pressure in a battery housing surrounding the battery exceeds a threshold pressure for expulsion of a gas (e.g., based on sensor data) and generate a signal for sending to a vent actuator proximate the vent (not shown) that causes the vent to operate between an open state and a closed state. In some examples, the vent controller 530 can determine the open state or closed state based at least in part on an indication that a collision occurred or likely to occur in the future (determined by a same or different component). In various examples, the vent controller 530 can cause a first vent on a first side of the battery opposite a location of a collision (or predicted collision) based at least in part on determining that the pressure in the battery housing exceeds the threshold pressure. In other examples, the vent controller 530 can cause a second vent on a second side associated with the location of the collision (or predicted collision) to be in a closed state to prevent gas being emitted into an area associated with the collision.

As can be understood, the components discussed herein (e.g., the localization component 520, the perception component 522, the planning component 524, the one or more system controllers 526, the one or more maps 528, the vent controller 530) are described as divided for illustrative purposes. However, the operations performed by the various components may be combined or performed in any other component of the vehicle computing device(s) 504.

In some instances, aspects of some or all of the components discussed herein may include any models, techniques, and/or machine learned techniques. For example, in some instances, the components in the memory 518 (and the memory 538, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device(s) 504. Additionally, or in the alternative, the sensor system(s) 506 may send sensor data, via the one or more networks 536, to the one or more computing device(s) 534 at a particular frequency, after a lapse of a predetermined period of time, in near real-time, etc.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive assembly(s) 514. Also, the communication connection(s) 510 may allow the vehicle to communicate with other nearby computing device(s) (e.g., remote computing device 534, other nearby vehicles, etc.) and/or one or more remote sensor system(s) (not shown) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device(s) 504 to another computing device or a network, such as network(s) 536. For example, the communications connection(s) 510 can enable Wi-Fi-based communication such as via frequencies defined by the IEEE 502.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive assembly(s) 514. In some examples, the vehicle 502 may have a single drive assembly 514. In at least one example, if the vehicle 502 has multiple drive assemblies 514, individual drive assemblies 514 may be positioned on opposite ends of the vehicle 502 (e.g., the front and the rear, etc.). In at least one example, the drive assembly(s) 514 may include one or more sensor systems to detect conditions of the drive assembly(s) 514 and/or the surroundings of the vehicle 502, including determining or detecting a potential collision, determining an occurrence of a collision, and/or determining a location of the collision relative to the vehicle 102 (e.g., a sensor can detect or predict a side of the vehicle 502 associated with a collision). By way of example and not limitation, the sensor system(s) may include one or more wheel encoders (e.g., rotary encoders) to sense rotation of the wheels of the drive assemblies, inertial sensors (e.g., inertial measurement units, accelerometers, gyroscopes, magnetometers, etc.) to measure orientation and acceleration of the drive assembly, cameras or other image sensors, ultrasonic sensors to acoustically detect objects in the surroundings of the drive assembly, lidar sensors, radar sensors, etc. Some sensors, such as the wheel encoders may be unique to the drive assembly(s) 514. In some cases, the sensor system(s) on the drive assembly(s) 514 may overlap or supplement corresponding systems of the vehicle 502 (e.g., sensor system(s) 506).

The drive assembly(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, a heating ventilation and cooling (HVAC) system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 514 may include a drive assembly controller which may receive and preprocess data from the sensor system(s) and to control operation of the various vehicle systems. In some examples, the drive assembly controller may include one or more processors and memory communicatively coupled with the one or more processors. The memory may store one or more modules to perform various functionalities of the drive assembly(s) 514. Furthermore, the drive assembly(s) 514 may also include one or more communication connection(s) that enable communication by the respective drive assembly with one or more other local or remote computing device(s).

In at least one example, the direct connection 512 may provide a physical interface to couple the one or more drive assembly(s) 514 with the body of the vehicle 502. For example, the direct connection 512 may allow the transfer of energy, fluids, air, data, etc. between the drive assembly(s) 514 and the vehicle. In some instances, the direct connection 512 may further releasably secure the drive assembly(s) 514 to the body of the vehicle 502.

In at least one example, the localization component 520, the perception component 522, the planning component 524, the one or more system controllers 526, the one or more maps 528, and the vent controller 530 may process sensor data, as described above, and may send their respective outputs, over the one or more network(s) 536, to the computing device(s) 534. In at least one example, the localization component 520, the perception component 522, the planning component 524, the one or more system controllers 526, the one or more maps 528, and the vent controller 530 may send their respective outputs to the remote computing device(s) 534 at a particular frequency, after a lapse of a predetermined period of time, in near real-time, etc.

In some examples, the vehicle 502 may send sensor data to the computing device(s) 534 via the network(s) 536. In some examples, the vehicle 502 may receive sensor data from the computing device(s) 534 via the network(s) 536. The sensor data may include raw sensor data and/or processed sensor data and/or representations of sensor data. In some examples, the sensor data (raw or processed) may be sent and/or received as one or more log files.

The computing device(s) 534 may include processor(s) 540 and a memory 538 storing a training component 542. In some examples, the training component 542 may include functionality to train a machine learning model when and/or how to control one or more vents associated with a battery in the event of a collision or other over temperature battery events. The training component 542 can be used to improve determinations by a component of the vehicle 502 including determining a potential collision, a location of the collision relative to the vehicle, an intersection point in the future between the vehicle and an object, and so on. In some instances, the training component 450 may be executed by the processor(s) 438 to train a machine learning model based on training data which can include a wide variety of data, such as classifier labels, sensor data, audio data, image data, map data, inertia data, vehicle state data, historical data (log data), or a combination thereof, that is associated with a value (e.g., a desired classification, inference, prediction, etc.). Such values may generally be referred to as a "ground truth."

In some examples, the training component 542 can include training data that has been generated by a simulator. For example, simulated training data can represent examples where a vehicle collides with an object in an environment or nearly collides with an object in an environment, to provide additional training examples.

The processor(s) 516 of the vehicle 502 and the processor(s) 540 of the computing device(s) 534 may be any suitable processor capable of executing instructions to process data and perform operations as described herein. By way of example and not limitation, the processor(s) 516 and 540 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 538 are examples of non-transitory computer-readable media. The memory 518 and memory 538 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and memory 538 may include at least a working memory and a storage memory. For example, the working memory may be a high-speed memory of limited capacity (e.g., cache memory) that is used for storing data to be operated on by the processor(s) 516 and 540. In some instances, the memory 518 and memory 538 may include a storage memory that may be a lower-speed memory of relatively large capacity that is used for long-term storage of data. In some cases, the processor(s) 516 and 540 cannot operate directly on data that is stored in the storage memory, and data may need to be loaded into a working memory for performing operations based on the data, as discussed herein.

FIG. 5 also illustrates a battery 544, a battery 546, a battery 548, and a battery 550 representing one or more cells for proving power to the vehicle 502. Though illustrated as including three batteries in different locations, in various examples only one battery may be used in any one of the noted locations, depending on a size and configuration of the battery. For example, the vehicle 502 can include the battery 544 as well as a first energy absorber 532 and a second energy absorber 532 to absorb energy and/or to vent gas associated with the battery 544.

It should be noted that while FIG. 5 is illustrated as a distributed system, in alternative examples, components of the vehicle 502 may be associated with the computing device(s) 534 and/or components of the computing device(s) 534 may be associated with the vehicle 502. That is, the vehicle 502 may perform one or more of the functions associated with the computing device(s) 534, and vice versa.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the claims.

FIG. 4 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

The following paragraphs describe various examples. Any of the examples in this section may be used with any other of the examples in this section and/or any of the other examples or embodiments described herein.

A: A vehicle comprising: a vehicle body; a battery disposed beneath at least a portion of the vehicle body, the battery comprising a battery housing having a vent opening for expulsion of gas from the battery housing; and an energy absorber configured to absorb energy of an impact to the vehicle body and configured to protect the battery during a collision, the energy absorber comprising: a hollow tube disposed between the battery housing and a side of the vehicle body and extending in a longitudinal direction of the vehicle; and a passage extending through a sidewall of the hollow tube, the passage being aligned with the vent opening of the battery housing to receive the gas from the battery housing and redirect the gas along at least a portion of a length of the hollow tube.

B: The vehicle of paragraph A, wherein: the energy absorber further comprises one or more additional hollow tubes disposed between the battery housing and the side of the vehicle body and extending in the longitudinal direction of the vehicle, and one or more additional passages fluidly connect an interior of the hollow tube with an interior of the one or more additional hollow tubes.

C: The vehicle of paragraph A or B, further comprising a valve or burst disk disposed in the vent opening configured to seal the vent opening, the valve or burst disk being activatable to open, in response to a pressure in the battery housing exceeding a threshold pressure, for expulsion of the gas.

D: The vehicle of any of paragraphs A-C, wherein: the battery is disposed beneath a passenger compartment of the vehicle body, and the hollow tube extends at least to an extent of the passenger compartment and is configured to direct the gas away from an exit of the passenger compartment.

E: The vehicle of any of paragraphs A-D, wherein the hollow tube further comprises an exhaust opening for exhausting the gas to an environment, and the vehicle further comprising a deflector to deflect the gas to a region between a passenger compartment of the vehicle and a tire of the vehicle when the gas exits the hollow tube.

F: A system comprising: a battery comprising a battery housing having a vent opening for expulsion of gas from the battery housing, the battery housing having a length and a width; and an energy absorber configured to absorb energy of an impact and configured to protect the battery during a collision, the energy absorber comprising: a hollow tube disposed adjacent to the battery housing and extending in a direction parallel to the length of the battery housing; and a passage extending through a sidewall of the hollow tube, the passage being aligned with the vent opening of the battery housing to receive the gas from the battery housing and redirect the gas along at least a portion of a length of the hollow tube.

G: The system of paragraph F, wherein the energy absorber further comprising one or more additional hollow tubes disposed adjacent and parallel to the hollow tube.

H: The system of paragraph F or G, further comprising a valve or burst disk disposed in the vent opening configured to seal the vent opening, the valve or burst disk being activatable to open, in response to a pressure in the battery housing exceeding a threshold pressure, for expulsion of the gas.

I: The system of any of paragraphs F-H, wherein the hollow tube extends at least to an extent of the battery housing and is configured to direct the gas away from the battery housing.

J: The system of paragraph I, wherein the hollow tube further comprises an exhaust opening for exhausting the gas to an environment, and the system further comprising a deflector to deflect the gas exiting the hollow tube.

K: The system of any of paragraphs F-J, wherein the energy absorber is plastically deformable in response to a collision.

L: The system of any of paragraphs F-K, wherein: the energy absorber comprises a first portion proximate the battery housing and a second portion distal from the battery housing, and a rigidity of the first portion is higher than a rigidity of the second portion.

M: The system of any of paragraphs F-L, further comprising a heat shield disposed on a surface of the energy absorber to shield portions of the energy absorber from direct impingement of the gas.

N: The system of any of paragraphs F-M, wherein the system is a vehicle and the battery is disposed one of: beneath at least a portion of a passenger compartment of the vehicle; above at least a portion of a passenger compartment of the vehicle; or beneath a seat of the vehicle.

O: The system of any of paragraphs F-N, wherein the vent opening is a first vent opening disposed in a first side of the battery housing, and the system further comprising: a second vent opening disposed in a second side of the battery housing opposite the first side of the battery housing; a first valve or burst disk disposed in the first vent opening; and a second valve or burst disk disposed in the second vent opening, wherein the first valve is open in response to an impact on an opposing side of the battery housing while the second valve is configured to remain closed in response to the impact.

P: The system of paragraph O, further comprising: one or more processors; and non-transitory memory storing instructions that, when executed by the one or more processors, cause the system to perform operations comprising: detecting an impact or a potential impact to the system; determining that the impact or the potential impact occurs on the first side of the battery housing; and at least one of: (a) opening the first valve on the first side of the battery housing or (b) preventing the second valve on the second side of the battery housing from opening.

Q: The system of any of paragraphs F-P, wherein the energy absorber is coupled to a vehicle body using an adhesive or a fastener(s).

R: The system of any of paragraphs F-Q, further comprising a gasket or seal to prevent gas from getting into a passenger compartment of a vehicle.

S: The system of any of paragraphs F-R, wherein: the vent is a first vent, and further comprising: a second vent to receive the gas from the battery housing and redirect the gas away from a passenger compartment of a vehicle or a tire of the vehicle.

T: The system of any of paragraphs F-S, wherein the energy absorber comprises at least one of aluminum, steel, carbon fiber, or plastic.

U: The system of any of paragraphs F-T, further comprising a roll cage type structure surrounding a portion of the battery housing to redirect the gas to a top portion of the roll cage type structure.

V: The system of any of paragraphs F-U, wherein the hollow tube is removably coupled to the battery housing or integrated as a portion of the battery housing.

W: A method comprising: detecting, by a computing device associated with a vehicle, an occurrence of a collision or a potential collision, determining a location of the collision or the potential collision relative to the vehicle, and at least one of: opening a first vent on a first side of a battery opposite the location of the collision or the potential collision, or preventing a second vent from opening on a second side associated with the location of the collision or the potential collision.

X: The method of paragraph W, further comprising: determining that a pressure in a battery housing surrounding the battery exceeds a threshold pressure for expulsion of a gas; and opening the first vent on the first side of the battery opposite the location of the collision based at least in part on determining that the pressure in the battery housing exceeds the threshold pressure.

Y: The method of paragraph W or X, further comprising: controlling operation of the first vent or the second vent between an open state and a closed state based at least in part on sensor data from a sensor of the vehicle.

Z: The method of any of paragraphs W-Y, further comprising: receiving sensor data from a sensor associated with the vehicle, wherein determining the location of the collision is based at least in part on the sensor data.

While the example clauses described above are described with respect to particular implementations, it should be understood that, in the context of this document, the content of the example clauses can also be implemented via a method, device, system, computer-readable medium, and/or another implementation. Additionally, any of examples A-Z may be implemented alone or in combination with any other one or more of the examples A-Z.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While features, components, and operations may be presented in a certain arrangement, configuration, and/or order, the arrangement, configuration, and/or order may be rearranged, combined, or omitted without changing the function of the systems and methods described. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
    a battery comprising a battery housing having a vent opening for expulsion of gas from the battery housing, the battery housing having a length and a width;
    a first vent opening disposed in a first side of the battery housing;
    a second vent opening disposed in a second side of the battery housing opposite the first side of the battery housing;
    an energy absorber configured to absorb energy of an impact and configured to protect the battery during a collision, the energy absorber comprising:
    a hollow tube disposed adjacent to the battery housing and extending in a direction parallel to the length of the battery housing; and
    a passage extending through a sidewall of the hollow tube, the passage being aligned with the first vent opening or the second vent opening of the battery housing to receive the gas from the battery housing and redirect the gas along at least a portion of a length of the hollow tube;
    a first valve or first burst disk disposed in the first vent opening; and
    a second valve or second burst disk disposed in the second vent opening,
    wherein the first valve is open in response to an impact on an opposing side of the battery housing while the second valve is configured to remain closed in response to the impact.

2. The system of claim 1, wherein the energy absorber further comprising one or more additional hollow tubes disposed adjacent and parallel to the hollow tube.

3. The system of claim 1, wherein the hollow tube extends at least to an extent of the battery housing and is configured to direct the gas away from the battery housing.

4. The system of claim 1, further comprising a deflector to deflect the gas exiting the hollow tube.

5. The system of claim 1, further comprising a heat shield disposed on a surface of the energy absorber to shield portions of the energy absorber from direct impingement of the gas.

6. A vehicle comprising:
    a vehicle body;
    a battery comprising a battery housing having a vent opening for expulsion of gas from the battery housing, the battery housing having a length and a width; and
    an energy absorber configured to absorb energy of an impact and configured to protect the battery during a collision, the energy absorber comprising:
    a first portion proximate the battery housing and a second portion distal from the battery housing, wherein the first portion or the second portion is configured to receive the gas;
    a hollow tube disposed adjacent to the battery housing and extending in a direction parallel to the length of the battery housing; and
    a passage extending through a sidewall of the hollow tube, the passage being aligned with the vent opening of the battery housing to receive the gas from the battery housing and redirect the gas along at least a portion of a length of the hollow tube.

7. The vehicle of claim 6, wherein the energy absorber further comprising one or more additional hollow tubes disposed adjacent and parallel to the hollow tube.

8. The vehicle of claim 6, further comprising a valve or burst disk disposed in the vent opening configured to seal the vent opening, the valve or burst disk being activatable to open, in response to a pressure in the battery housing exceeding a threshold pressure, for expulsion of the gas.

9. The vehicle of claim 6, wherein the hollow tube extends at least to an extent of the battery housing and is configured to direct the gas away from the battery housing.

10. The vehicle of claim 6, further comprising a deflector to deflect the gas exiting the hollow tube.

11. The vehicle of claim 6, wherein the energy absorber is plastically deformable in response to the collision.

12. The vehicle of claim 6, wherein the vent opening is configured to operate in an open state or a closed state based at least in part on sensor data from a sensor of the vehicle.

13. The vehicle of claim 6, further comprising a heat shield disposed on a surface of the energy absorber to shield portions of the energy absorber from direct impingement of the gas.

14. The vehicle of claim 6, the battery is disposed one of:
    beneath at least a portion of a passenger compartment of the vehicle;
    above at least the portion of a passenger compartment of the vehicle; or
    beneath a seat of the vehicle.

15. The vehicle of claim 6, wherein the vent opening is a first vent opening disposed in a first side of the battery housing, and the vehicle further comprising:
    a second vent opening disposed in a second side of the battery housing opposite the first side of the battery housing;
    a first valve or burst disk disposed in the first vent opening; and
    a second valve or burst disk disposed in the second vent opening,
    wherein the first valve is open in response to the impact on an opposing side of the battery housing while the second valve is configured to remain closed in response to the impact.

16. The vehicle of claim 15, further comprising:
    one or more processors; and
    non-transitory memory storing instructions that, when executed by the one or more processors, cause operations comprising:
        detecting an impact or a potential impact to the vehicle;
        determining that the impact or the potential impact occurs on the first side of the battery housing; and
        at least one of: (a) opening the first valve on the first side of the battery housing or (b) preventing the second valve on the second side of the battery housing from opening.

17. A system comprising:
    one or more processors; and
    non-transitory memory storing instructions that, when executed by the one or more processors, cause the system to perform operations comprising:

detecting, by a computing device associated with a vehicle, an occurrence of a collision or a potential collision, determining a location of the collision or the potential collision relative to the vehicle, and at least one of:

opening a first vent on a first side of a battery opposite the location of the collision or the potential collision, or preventing a second vent from opening on a second side associated with the location of the collision or the potential collision.

18. The system of claim 17, the operations further comprising:

determining that a pressure in a battery housing surrounding the battery exceeds a threshold pressure for expulsion of a gas; and opening the first vent on the first side of the battery opposite the location of the collision based at least in part on determining that the pressure in the battery housing exceeds the threshold pressure.

19. The system of claim 17, the operations further comprising:

controlling operation of the first vent or the second vent between an open state and a closed state based at least in part on sensor data from a sensor of the vehicle.

20. The system of claim 17, the operations further comprising:

receiving sensor data from a sensor associated with the vehicle, wherein determining the location of the collision is based at least in part on the sensor data.

* * * * *